Patented May 11, 1948

2,441,355

UNITED STATES PATENT OFFICE 2,441,355

WATER-SOLUBLE ANTHRAQUINONE DYES

Paul Grossmann, Binningen, Switzerland, assignor to Society of Chemical Industry in Basle, Basel, Switzerland, a Swiss firm No Drawing. Application March 8, 1945, Serial No. 581,718. In Switzerland January 14, 1944

Section 1, Public Law 690, August 8, 1946
Patent expires January 14, 1964

5 Claims. (Cl. 260—376)

The present invention is concerned with water-soluble anthraquinone derivatives. More particularly the present invention is concerned with products of the said kind serving as acetate rayon dyestuffs.

It is known that amongst anthraquinone derivatives there are many useful acetate rayon dyestuffs both of the water-insoluble and of the water-soluble type. It is to be noted however that many of the previous dyestuffs of this series are defective in fastness, especially fastness to light or in affinity for the acetate rayon fiber. It is an object of the present invention to provide new dyestuffs of the water-soluble type which are superior to the previous ones. Further objects will appear as the specification proceeds.

According to this invention valuable water-soluble anthraquinone derivatives are made by treating anthraquinone - hydroxyalkylthioethers with etherifying agents which contain, besides the group bringing about esterification, at least one group imparting solubility in water, if necessary after suitable conversion.

The anthraquinone - hydroxyalkylthioethers used as starting materials for the present process may contain several hydroxyalkylthioether groups, preferably however only one hydroxyalkylthioether group. Such groups can be attached in $\alpha$-positions, preferably however in $\beta$-positions of the anthraquinone nucleus. Anthraquinone derivatives of this kind can be obtained in known manner, for example by treating mercapto anthraquinones with hydroxylalkylating agents. Among the latter there are especially named the halogen hydrins of the polyalcohols of low molecular weight, such as glycerol chlorohydrin, propylene chlorohydrin, butylene chlorohydrin and particularly glycol chlorohydrin. Thus the thioether grouping may contain an alkyl radical of low molecular weight, e. g. composed of 2 to 6 carbon atoms to which more than one or preferably only one hydroxyl group is bound. For the sake of simplicity and because of easy preparation the grouping —S—$C_2H_4$—OH has been chiefly used in the examples below, but it is to be understood that the invention is not limited thereto.

The anthraquinone hydroxyalkylthioethers used as starting materials may contain further substituents of various kind, particularly such as themselves do not possess a water-solubilizing action. Among these there are particularly mentioned amino groups which themselves may again be substituted in various manner, e. g. arylated or alkylated, further also hydroxyl groups.

It is advantageous to use such anthraquinones as starting materials as contain, for example besides a hydroxyalkylthioether group in $\beta$-position, at least one, preferably however two or more amino groups in $\alpha$-position. Thus for example a primary amino group may be attached in an $\alpha$-position which is in ortho-position with respect to the thioether group, and an auxochromic group, e. g. a hydroxyl group or a primary or preferably secondary, alkylated or arylated, for example phenylated amino group, in para-position to the primary amino group. Further substituents may be attached to the other benzene ring forming the anthraquinone skeleton. Mention is made, for example, of 1-amino-4 - phenylaminoanthraquinone - 2 - ($\beta$-hydroxyethyl) - thioether or -2- ($\beta$-$\gamma$-dihydroxypropyl) - thioether, 1 - amino-4-(meta-toluidino)-anthraquinone-2-($\beta$-hydroxyethyl)-thioether, 1-amino-4 - (ortho-anisidino) - anthraquinone-2-($\beta$-hydroxyethyl)-thioether, 1-methylamino-4-(ortho-anisidino) - anthraquinone-2-($\beta$-hydroxyethyl)-thioether, 1-amino - 4 - (para - aminophenyl)-aminoanthraquinone-2-($\beta$-hydroxyethyl) - thioether, 1-amino - 4 - methylamino-anthraquinone-as well as 1:4-diaminoanthraquinone-2-($\beta$-hydroxyethyl)-thioether.

Esterifying agents which contain, besides the group bringing about esterification, at least one group imparting solubility in water, are primarily polybasic acids and functional derivatives thereof. Among these there are suitable purely inorganic acids, such as sulfuric acid or phosphoric acids as well as organic acids, e. g. those which contain at least one, preferably however more than one carboxyl group. Among the dicarboxylic acids there are named those which form inner anhydrides, such as succinic acid, phthalic acid, quinolinic acid and maleic acid, since the esterification can be carried out in many cases particularly smoothly with such dicarboxylic acid anhydrides. Moreover, also other functional derivatives of polybasic acids, such as acid halides, and in some cases also the acids themselves, can be used for the esterification.

The esterification is performed in known manner, for example in an excess of the respective acid or its derivative or in an indifferent solvent or diluent, e. g. in hydrocarbons, the use of tertiary bases such as pyridine or dimethylaniline being often of advantage.

The esterification should preferably be carried out in such a manner that mainly or exclusively the hydroxyl groups attached to the thioether group participate in the reaction. If more than one hydroxyl group is present in a thioether grouping it may be necessary to use more than one molecular proportion of esterifying agent; otherwise part of the anthraquinone compound might remain unchanged (and therefore insoluble), whereas in part of the compound more than one hydroxyl group might be esterified. As a rule the affinity for acetate rayon decreases when two or more hydroxyl groups are esterified according to the present process in view of the increasing number of solubilizing groups. The resulting products of the esterification can be soluble already as such. In many cases it is however advantageous to convert them in known manner into water-soluble salts, for example into alkali metal salts or ammonium salts. For this purpose it is possible to precipitate for example the resulting product of the esterification—provided it contains a free carboxyl group—in an aqueous medium by addition of a strong acid, or the esterification mixture can be introduced directly into water containing acid, filter the dyestuff in the form of the free carboxylic acid, and convert the filter cake into a soluble salt by addition of the necessary quantity of alkali. As alkali there can be used for example alkali metal hydroxides, such as caustic soda solution or potassium hydroxide solution in equivalent quantity. In many cases it may also be appropriate to add part of the necessary alkali in the form of a buffer substance, such as alkali bicarbonates, borax, and the like.

The aqueous dyestuff pastes directly obtained can be used for dyeing in such a form; this is particularly advantageous if the dyestuff undergoes an undesired change when being dried. Most dyestuffs, however, stand drying when working under careful conditions, for example under a strongly reduced pressure at a moderate temperature; if necessary, dehydrating or buffering agents can further be added to the dried preparation.

The water-soluble anthraquinone derivatives obtained according to the present process are partly valuable intermediate products and partly dyestuffs. Particularly it is possible to obtain a series of water-soluble dyestuffs for acetate rayon which may be used for dyeing and printing various fibers of cellulose esters and cellulose ethers. The dyeings and prints thus obtained are characterized partly by very good fastness properties, especially fastness to light.

The following examples illustrate the invention, the parts being by weight:

Example 1

3.9 parts of 1-amino-4-anilidoanthraquinone-2-hydroxyethyl-thioether are introduced at 0° C. into 15 parts of sulfuric acid monohydrate. As soon as a test portion of the dyestuff is completely soluble in dilute alkalis, the whole is poured onto ice to which 10 per cent of common salt has been added. The mixture is filtered, the filtrate washed with a common salt solution of 5 per cent strength until neutral and dried at about 60° C. The dyestuff of the probable formula

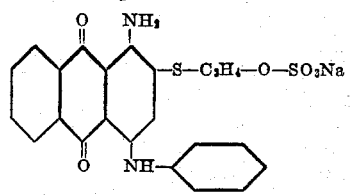

is a dark blue powder which dissolves in water with a blue coloration, in sulfuric acid with a red blue coloration and dyes acetate rayon blue tints possessing an excellent fastness to light.

Example 2

3.9 parts of 1-amino-4-anilidoanthraquinone-2-hydroxyethyl-thioether are heated to 60° C. in 10 parts of pyridine with 1.5 parts of maleic acid anhydride until a test portion of the dyestuff is completely soluble in dilute alkalis. The dyestuff is precipitated by pouring the solution into water containing hydrochloric acid, whereupon it is filtered and washed with water until neutral. The dyestuff is then triturated with the equivalent quantity of caustic soda solution, dried in a vacuum at 60–70° C. and ground, if desired with addition of anhydrous alkali salts such as sodium sulfate. It is a dark blue powder of the probable formula

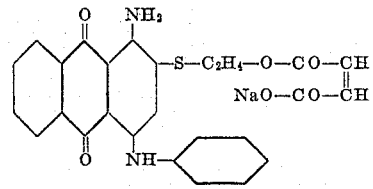

which dissolves in water with a blue coloration, in sulfuric acid with a dirty violet coloration and dyes acetate silk from a saline bath powerful blue tints possessing an excellent fastness to light.

Instead of pyridine there can also be used other solvents, for example dimethylaniline. Instead of maleic acid anhydride there can also be used the equivalent quantity of quinolinic acid anhydride, succinic acid anhydride or phthalic acid anhydride, as well as substitution products of these compounds, similar dyestuffs being thus obtained. Dyestuffs which are even better soluble are obtained by using 1-amino-4-phenylaminoanthraquinone - 2 - dihydroxypropylthioether. A very similar dyestuff is obtained by starting from 1-amino-4-meta-toluidinoanthraquinone-2-(β - hydroxyethyl)-thioether. With 1-amino-4-ortho-anisidinoanthraquinone - 2 - (β - hydroxyethyl)-thioether there is obtained a dyestuff dyeing green-blue tints; such a dyestuff is also obtained with 1-methylamino - 4 - ortho-anisidinoanthraquinone-2-hydroxyethylthioether. With 1-amino-4-(4'-aminophenyl) - aminoanthraquinone-2-hydroxyethylthioether there is obtained a blue-green dyestuff.

Example 3

3.2 parts of 1-amino-4-methylaminoanthraquinone-2-hydroxyethylthioether are heated to about 60° C. in 10 parts of pyridine and 1.2 parts of maleic acid anhydride until the dyestuff is completely soluble in dilute alkalis. The dyestuff is isolated as described in Example 2. It is a dark blue powder of the probably formula

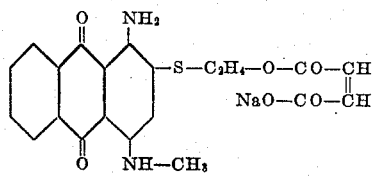

which dissolves in water with a blue coloration and dyes acetate rayon blue tints.

Example 4

6.3 parts of 1-amino-4-hydroxyanthraquinone-2-hydroxyethyl-thioether are heated in 15 parts of pyridine to 60° C. with 2.3 parts of maleic acid anhydride until the dyestuff is soluble in dilute alkalis. The dyestuff is isolated as described in Example 2. It is a dark violet powder of the probable formula

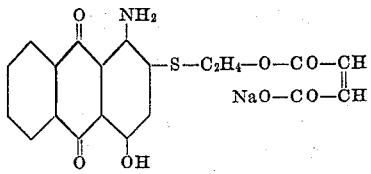

which dissolves in water with a red coloration and dyes acetate rayon red tints.

*Example 5*

100 parts of desized and well wetted acetate rayon are introduced at 40° C. into a dye-bath containing 2 parts of the dyestuff obtained according to Example 2, first paragraph, 30 parts of common salt and 5 parts of ammonium oxalate in 4000 parts of water, the temperature is raised to 80° C. within ½ hour and dyeing is continued for a further hour at about 80–85° C. The material is rinsed and finished in usual manner. The acetate rayon is dyed powerful blue tints which are fast to light.

What I claim is:

1. The products of the formula

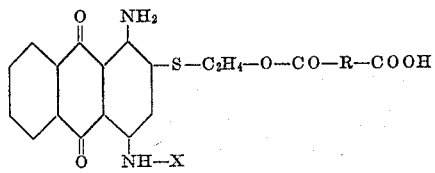

wherein —CO—R—CO— stands for the radical of a dicarboxylic acid and X stands for a radical of the benzene series which is free from solubilizing groups and carries at most one substituent selected from the group consisting of methyl and methoxy, which products in the form of their alkali metal salts are soluble in water.

2. Products of the general formula

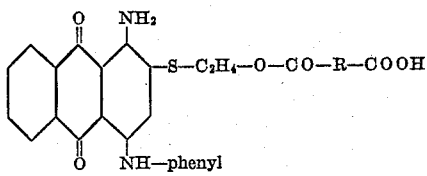

wherein —CO—R—CO— stands for the radical of a dicarboxylic acid, which products in the form of their alkali metal salts are soluble in water.

3. The product of the formula

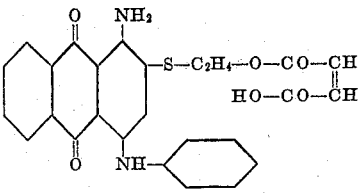

which product in the form of its alkali metal salts is soluble in water.

4. The product of the formula

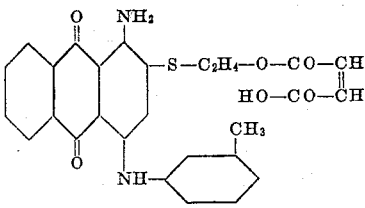

which product in the form of its alkali metal salts is soluble in water.

5. The product of the formula

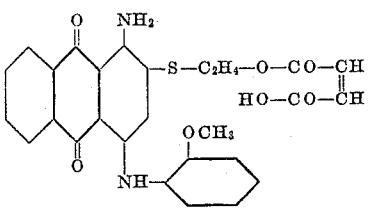

which product in the form of its alkali metal salts is soluble in water.

PAUL GROSSMANN.

REFERENCES CITED

The following references are of record in the file of this patent:

UNITED STATES PATENTS

| Number | Name | Date |
| --- | --- | --- |
| 1,710,992 | Kranzlein | Apr. 30, 1929 |
| 2,226,909 | Peter | Dec. 31, 1940 |
| 2,305,690 | Grossmann | Dec. 22, 1942 |

FOREIGN PATENTS

| Number | Country | Date |
| --- | --- | --- |
| 127,439 | Switzerland | Dec. 17, 1925 |
| 506,526 | Great Britain | May 30, 1939 |

OTHER REFERENCES

Hoffman et al., "Journal of American Chemical Society," 45, pages 1831–1838 (1923).